United States Patent
Carambat

(10) Patent No.: US 8,596,570 B1
(45) Date of Patent: Dec. 3, 2013

(54) AIRCRAFT VEHICLE CENTRIFUGAL FAN APPARATUS

(76) Inventor: David Carambat, Covington, LA (US)

( * ) Notice: Subject to any disclaimer, the term of this patent is extended or adjusted under 35 U.S.C. 154(b) by 106 days.

(21) Appl. No.: 13/402,685

(22) Filed: Feb. 22, 2012

Related U.S. Application Data

(60) Provisional application No. 61/445,431, filed on Feb. 22, 2011.

(51) Int. Cl.
*B64C 29/00* (2006.01)

(52) U.S. Cl.
USPC .................................. 244/23 A; 244/12.1

(58) Field of Classification Search
USPC ............................... 244/23 A, 12.1
See application file for complete search history.

(56) References Cited

U.S. PATENT DOCUMENTS

| | | | | |
|---|---|---|---|---|
| 2,302,068 A * | 11/1942 | Stanley | ........................ | 416/226 |
| 2,308,477 A * | 1/1943 | James | ......................... | 244/12.1 |
| 2,588,570 A * | 3/1952 | Pitcairn | ........................ | 416/226 |
| 3,465,988 A * | 9/1969 | Anthony | ........................ | 244/12.1 |
| 4,935,277 A * | 6/1990 | Le Balc'h | ........................ | 428/71 |
| 5,269,656 A * | 12/1993 | Maga | ........................ | 416/189 |
| 5,277,541 A * | 1/1994 | Palmer | ........................ | 415/58.2 |
| 5,860,620 A * | 1/1999 | Wainfan et al. | ............ | 244/12.1 |
| 5,890,441 A * | 4/1999 | Swinson et al. | ............ | 244/12.3 |
| 6,016,992 A * | 1/2000 | Kolacny | ........................ | 244/12.6 |
| 6,050,520 A * | 4/2000 | Kirla | ........................... | 244/23 A |
| 6,200,094 B1 * | 3/2001 | Skoch et al. | ............... | 415/208.2 |
| 6,270,036 B1 * | 8/2001 | Lowe, Jr. | ....................... | 244/12.2 |
| 6,280,139 B1 * | 8/2001 | Romani et al. | ............... | 415/207 |
| 6,520,449 B2 * | 2/2003 | Illingworth | .................. | 244/12.1 |
| 6,561,456 B1 * | 5/2003 | Devine | ......................... | 244/12.1 |
| 7,037,074 B2 * | 5/2006 | Hoshino | ........................ | 416/62 |
| 7,648,339 B1 * | 1/2010 | Ediger et al. | .................. | 416/142 |
| 8,246,296 B2 * | 8/2012 | Smith | ........................... | 415/115 |
| 2002/0047071 A1 * | 4/2002 | Illingworth | .................. | 244/199 |
| 2002/0125366 A1 * | 9/2002 | Salas | ............................ | 244/12.1 |
| 2005/0000231 A1 * | 1/2005 | Lee | .................................. | 62/3.5 |
| 2005/0002792 A1 * | 1/2005 | Cartwright | ............... | 416/210 R |
| 2005/0147494 A1 * | 7/2005 | Hoshino | ........................ | 416/62 |
| 2007/0059180 A1 * | 3/2007 | Cartwright | ............... | 416/210 R |
| 2007/0069066 A1 * | 3/2007 | Lawson et al. | ............... | 244/12.1 |
| 2008/0170938 A1 * | 7/2008 | Shinohara | .................. | 415/208.1 |
| 2010/0098553 A1 * | 4/2010 | Smith | ......................... | 416/90 R |
| 2011/0030266 A1 * | 2/2011 | Roy et al. | ....................... | 43/113 |
| 2011/0101155 A1 * | 5/2011 | Smith | ........................... | 244/12.1 |
| 2011/0168834 A1 * | 7/2011 | Yoeli | ............................ | 244/12.3 |
| 2011/0173812 A1 * | 7/2011 | Karvinen | ...................... | 29/889.4 |
| 2012/0058884 A1 * | 3/2012 | Lee | ................................... | 502/5 |
| 2012/0248241 A1 * | 10/2012 | Goelet | ........................... | 244/30 |
| 2012/0280091 A1 * | 11/2012 | Saiz | ............................... | 244/7 R |
| 2013/0043353 A1 * | 2/2013 | Balaskovic | .................... | 244/175 |

* cited by examiner

*Primary Examiner* — Christopher P Ellis
*Assistant Examiner* — Medhat Badawi
(74) *Attorney, Agent, or Firm* — Garvey, Smith, Nehrbass & North, L.L.C.; Charles C. Garvey, Jr.; Vanessa M. D'Souza

(57) ABSTRACT

An aircraft provides hovercraft power via fabric fans that produce lift for supporting the craft above an underlying support surface. Fabric fans are specially configured for maximum efficiency. In one embodiment, a helicopter utilizes the fan as part of a tail rotor assembly.

23 Claims, 9 Drawing Sheets

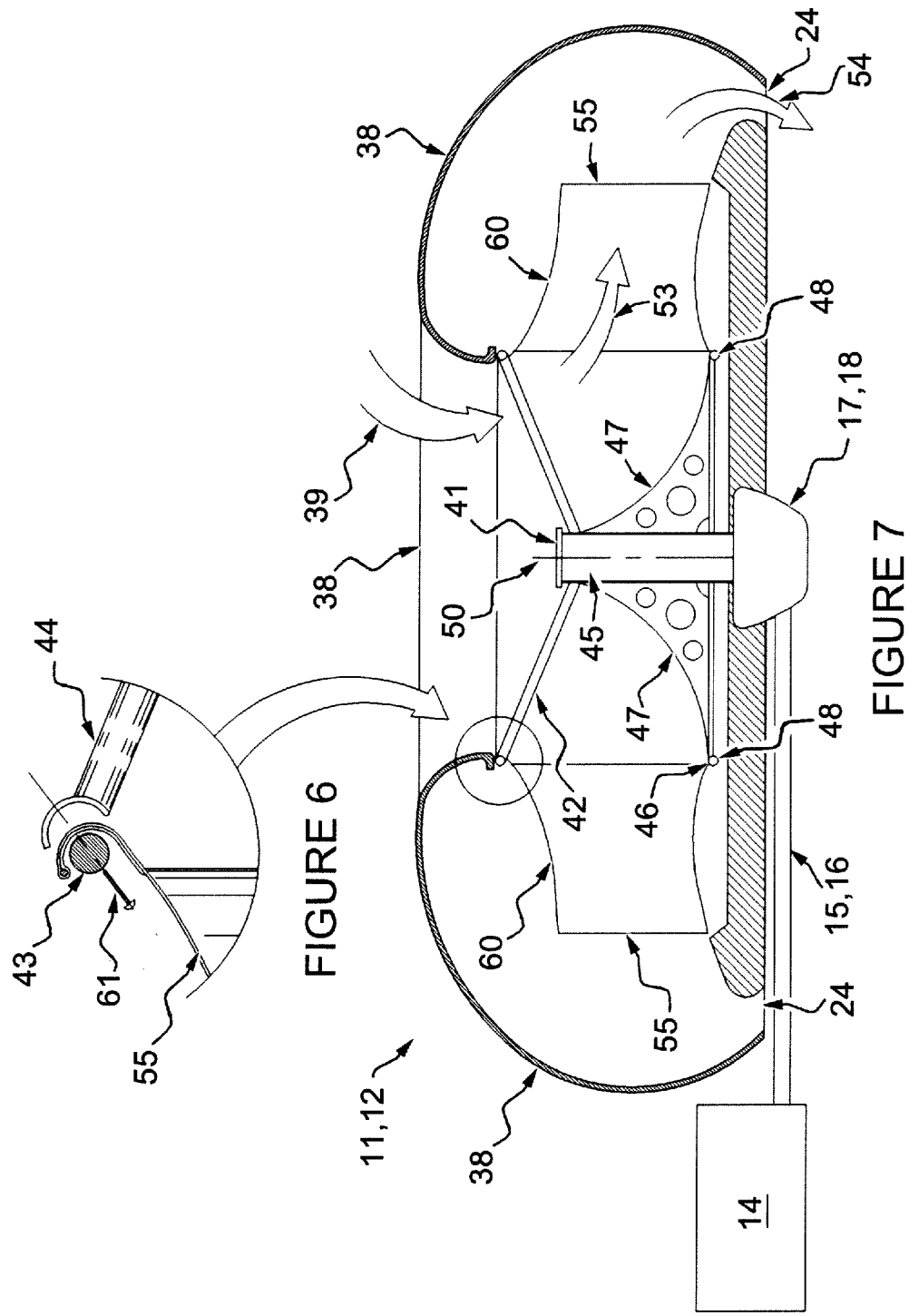

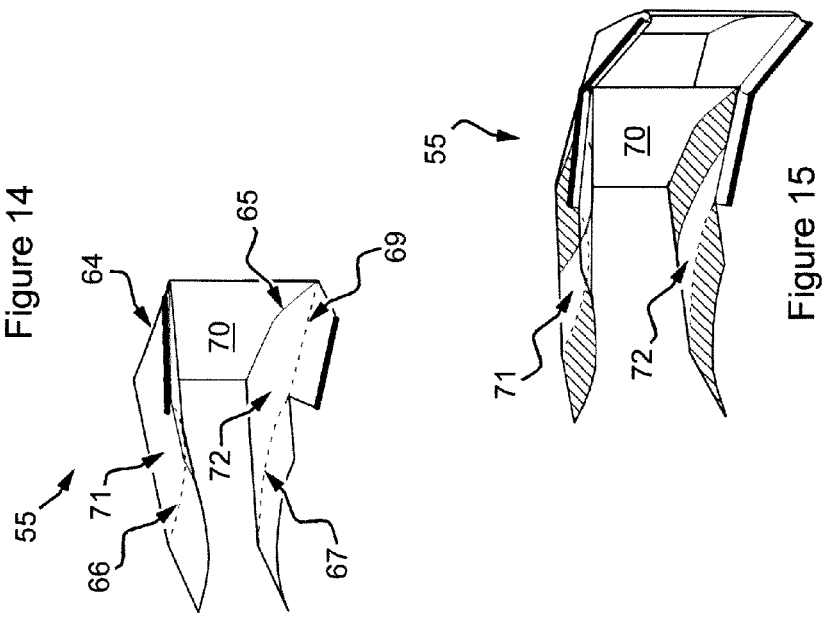

AIRCRAFT VEHICLE CENTRIFUGAL FAN APPARATUS

CROSS-REFERENCE TO RELATED APPLICATIONS

Priority of U.S. Provisional Patent Application Ser. No. 61/445,431, filed Feb. 22, 2011, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a craft such as a hovercraft that employs one or more specially configured hovercraft fans.

2. General Background of the Invention

There is a growing demand for quieter and more efficient aircraft and unmanned aerial vehicles or unmanned aerial vehicles or UAV's. Until now the centrifugal fan has been overlooked due to the heavy solid construction required for stability of the fans complex geometry.

The original hovercraft engineers in the late 1960's used a type of centrifugal fan as the best solution for the needs of that unique aircraft. However they failed to find a lightweight fan that was able to absorb the power needed and flexible enough to accommodate the gyrating craft motions.

On hovercraft and light aircraft in which not so quiet, lightweight propulsion is required the choice has been limited to multi-bladed axial fans of larger diameter.

The following is incorporated herein by reference:

YIHUA CAO, DONG LI, QIANG ZHANG, HANG BIAN, "Recent Development of Rotorcraft Configuration", *Recent Patents on Engineering,* 1, 49-70, 2007.

BRIEF SUMMARY OF THE INVENTION

The present invention provides a craft, such as an aircraft or hovercraft that features a fabric fan that provides a high volume of air for lift and propulsion and using a quieter alternative to the much noisier axial propeller. Centrifugal fan arrangements have been established to have outstanding high volume flow and pressure characteristics. The primary use of conventional centrifugal fans has been in air-conditioning and heating ventilation units due to its superior low-noise operation.

A fabric fan of lightweight construction and superior low noise operation offers unique advantages to be applied in both conventional and new types of aircraft. Scalability of these easy to construct fabric fans are unlimited with regards to the size of aircraft built today.

Light aircraft have not applied the advanced characteristics of their larger jet propelled designs. The ability of a jet aircraft to provide pressurized air for thrust reversing, quick acting directional control as in the new F22 and stability wingtip jets as on the Harrier vertical take off and land (VTOL) fighter jet have long been desired but never conceived in a lighter, less expensive format for light aircraft.

The fan of the present invention, provides pressurized ducting around the entire craft. As in a jet aircraft, this pressurized air is used for stability, braking, steering in addition to lift and thrust.

The two primary problems preventing the widespread use of light aircraft is the lack of more convenient small airfields and the disturbing noise generated from conventional propellers. The adoption of the fabric fan of the present invention into a purpose built airframe will allow vertical take-off and landing (VTOL), omitting the need for runways. The low speed revolutions per minute (r.p.m.) could be between about 300-2000 r.p.m., more preferably between about 500 and 800 r.p.m. The extremely quiet nature of the fabric fan eliminates the second problem of excessive noise from light aircraft today.

The unmanned aerial vehicle market has been limited to the same propeller technology as light aircraft. The same reasons are that the centrifugal fan has until now been too heavy. An unmanned aerial vehicle using the propeller or fan of the present invention will allow unprecedented stealth and agility. The robust structure of the fabric fan of the present invention can absorb ballistic damage as does the bullet resistant aircraft shell.

The fabric fan of the present invention used in an unmanned aerial vehicle has the ability to take off vertically, hover on station effectively and fly transits with the economy of conventional unmanned aerial vehicles.

The fabric fan unmanned aerial vehicle of the present invention has extraordinary lift capacity that allows reconnaissance modules and conventional weapons to be mounted.

The fabric fan unmanned aerial vehicle of the present invention has the ability to scout below forest canopy, inside buildings and patrol at urban street level altitudes.

The fabric fan unmanned aerial vehicle of the present invention operates quiet enough to be undetected by an enemy. The fabric fan unmanned aerial vehicle of the present invention can land vertically with a central mounted weapon acting as a remote fire base. These same characteristics can also be utilized for rescue in hostile or dangerous environments.

There has been a lack of detectable progress in the development of a modern concept of "flying car" due to the same technical hurdles experienced by light aircraft. The total reliance of the present day aerospace design community on axial propellers has caused a huge (e.g. 50 year) set-back in light aircraft design progress.

The fabric fan of the present invention allows the actual creation of a flying car. The fabric fans, power and control of the flying car can provide more spacious interior while provided with a sleek styled body.

Automotive like seating and steering can be provided with a more robust attitude control via a forward mounted canard. Deployable wings may also be added if the demand for long range transits out of ground effect arises.

The hovercraft has gone into a design remission since shortly after its introduction in the 1950's. Those early designs utilized the centrifugal fan for both propulsion and lift due to its high flow and flat pressure characteristics. As the craft grew to absorb more horsepower, the custom built riveted aluminum and early fiberglass fans proved too fragile. As with light planes and airboats, they have since only utilized axial fans for thrust. Public outcry due to noise levels has prevented any widespread use of this otherwise highly efficient form of transportation.

Small recreational vehicles such as jet skis and all terrain vehicles have also been constrained due the noise and surface disturbance that occurs during operations. The fabric fan of the present invention will allow the creation of an amphibious all-terrain-vehicle design for recreational, rescue and personal transportation. Utilizing the high horsepower absorbing, lightweight centrifugal design will make new, marketable, recreational hovercraft possible.

The fabric fan air cushion recreational vehicle of the present invention will tread lightly on water or ground due to the nature of its air-cushion footprint and its low noise will prevent the negative effect of the other vehicles.

In accordance with the inventions there is provided an unmanned aerial vehicle and manned aircraft providing a fabric fan(s) with a shaft driven by a motor centrally (e.g. mounted). These fans of the present invention provide pressurized air flow directed in generating dynamic lift and thrust. The aircraft air-flow is distributed by an enclosed duct within the body shell.

A narrow open slot is provided around the periphery of each fan unit, this slot provides a high speed "momentum" curtain of moving air entrapping the air-cushion which forms underneath the vehicle while in ground effect.

Forward thrust air is expelled via rear open duct and across control rudders for directional control. Thrust air can be throttled by the operator or electronically, via a hinged door panel which allows controlled amount of thrust only when needed.

A forward mounted hinged vent in the aircraft pressurized duct is operator or electronically controlled to allow air breaking for controlled stops or rapid deceleration.

The proposed aircraft and unmanned aerial vehicle can fly free of ground effect due to the lift capacity of the fabric fans. Once airborne the aircraft can deploy conventional wings for more efficient long range transit. The fabric fans of the present invention can provide all thrust and some control via venting for this mode of operation.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 6 is a fragmentary view of a preferred embodiment of the apparatus of the present invention;

FIG. 7 is a fragmentary view of a preferred embodiment of the apparatus of the present invention;

FIGS. 12-15 are fragmentary view of a preferred embodiment of the apparatus of the present invention illustrating a stirrup assembly and its construction.

DETAILED DESCRIPTION OF THE INVENTION

Figure 3:
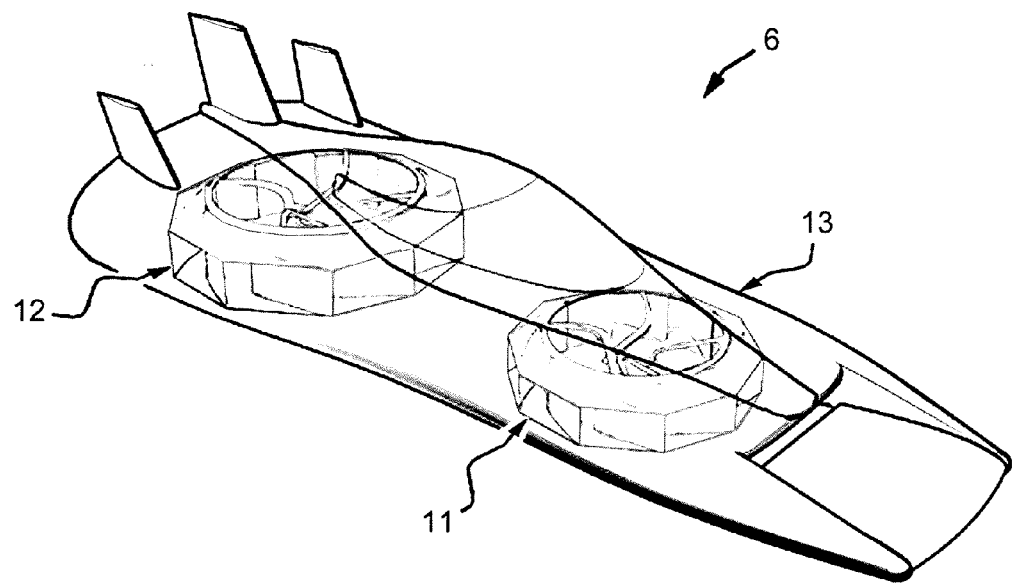
FIG. 3 is a perspective view of a preferred embodiment of the apparatus of the present invention.
Figure 4:
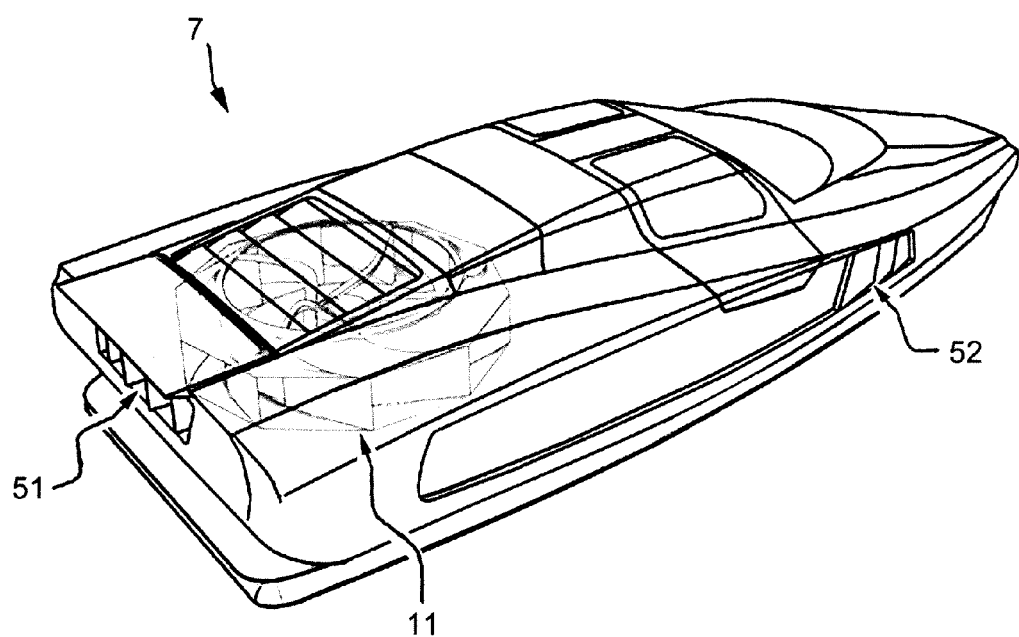
FIG. 4 is an example of an aircraft that could be configured to operate as an embodiment of the apparatus of the present invention.
Figure 5:
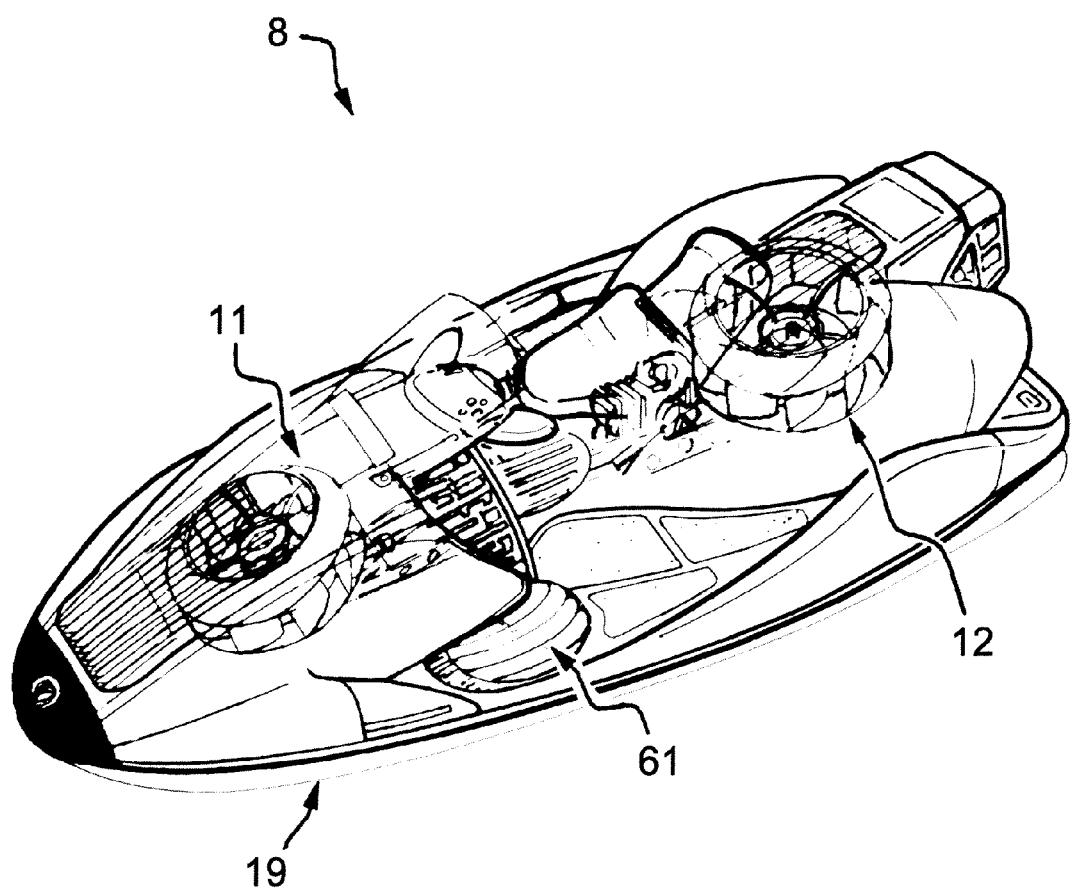
FIG. 5 is a perspective view of a preferred embodiment of the apparatus of the present invention.
Figure 8:
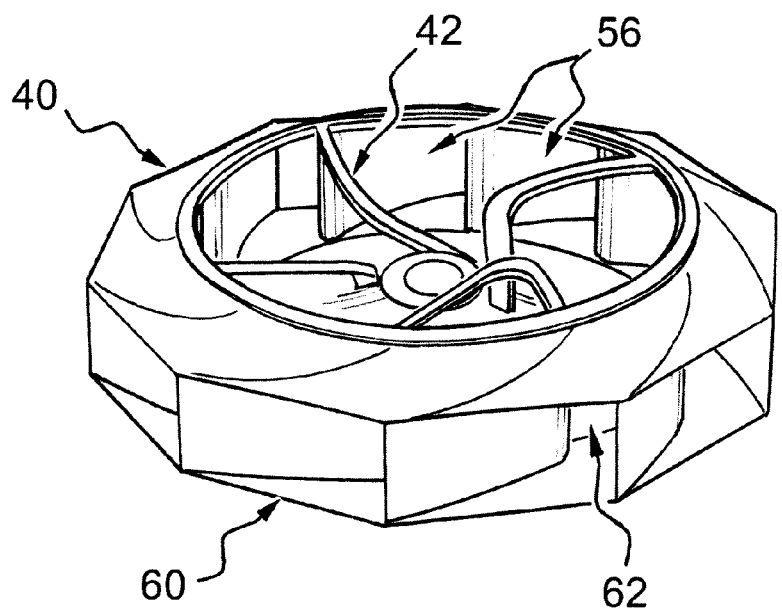
FIG. 8 is a partial perspective view of a preferred embodiment of the apparatus of the present invention.
Figure 9:
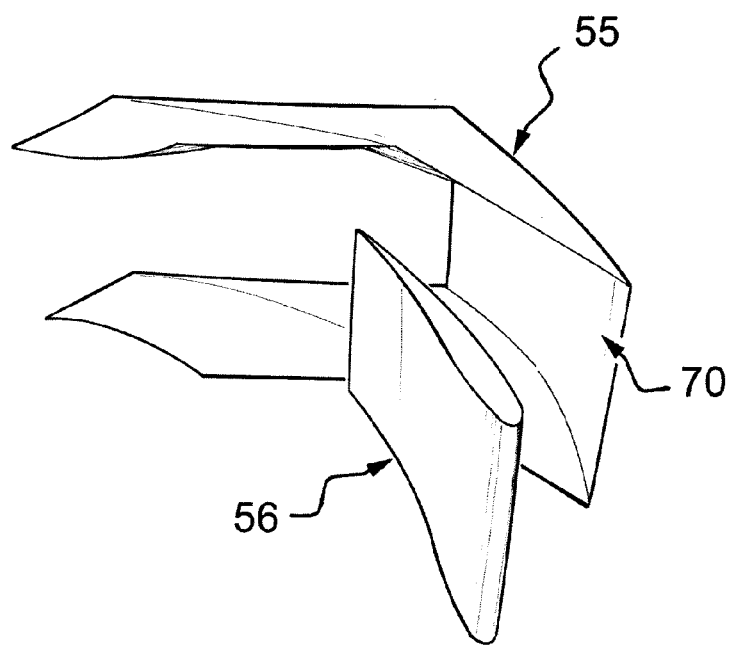
FIG. 9 is a partial perspective view of a preferred embodiment of the apparatus of the present invention.
Figure 10:
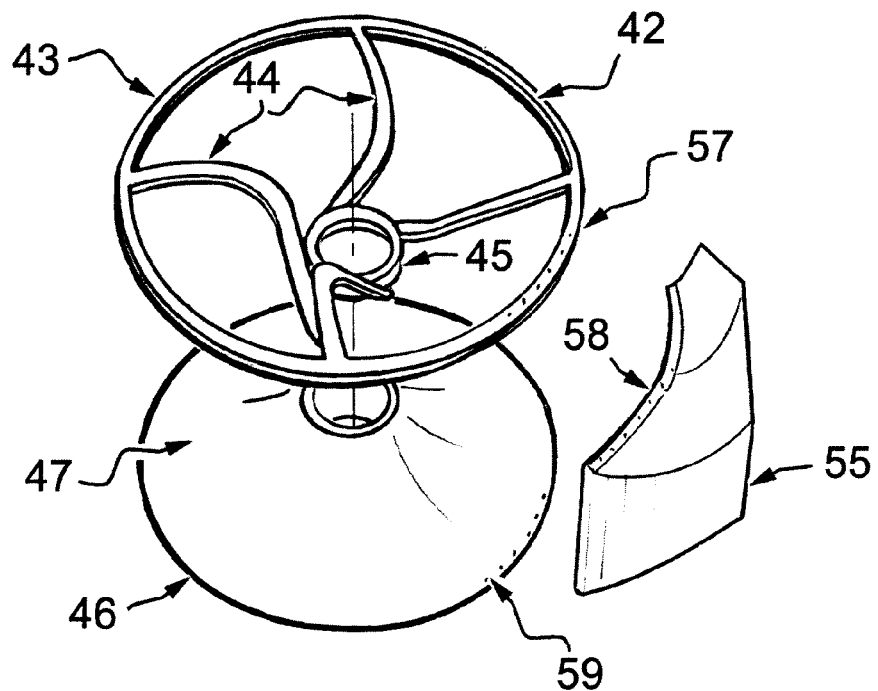
FIG. 10 is a partial perspective exploded view of a preferred embodiment of the apparatus of the present invention.
Figure 11:
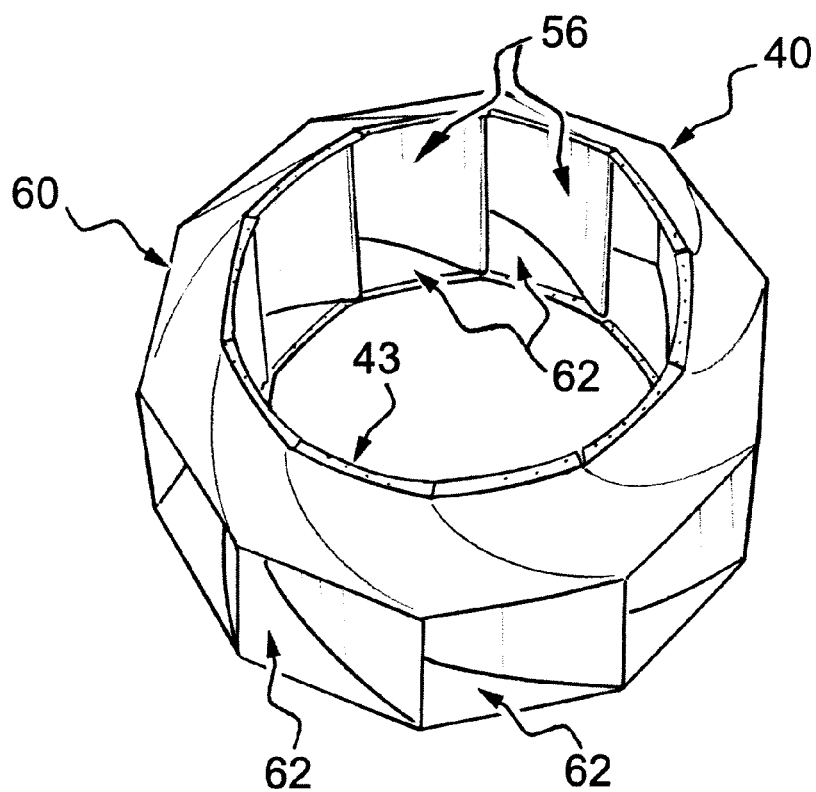
FIG. 11 is a partial perspective view of a preferred embodiment of the apparatus of the present invention.

FIGS. 1-5 show generally the preferred embodiment of the apparatus of the present invention, designated generally by the numeral 5 (FIGS. 1, 2) 6 (FIG. 3), 7 (FIG. 4), and 8 (FIG. 5).

Figure 1:
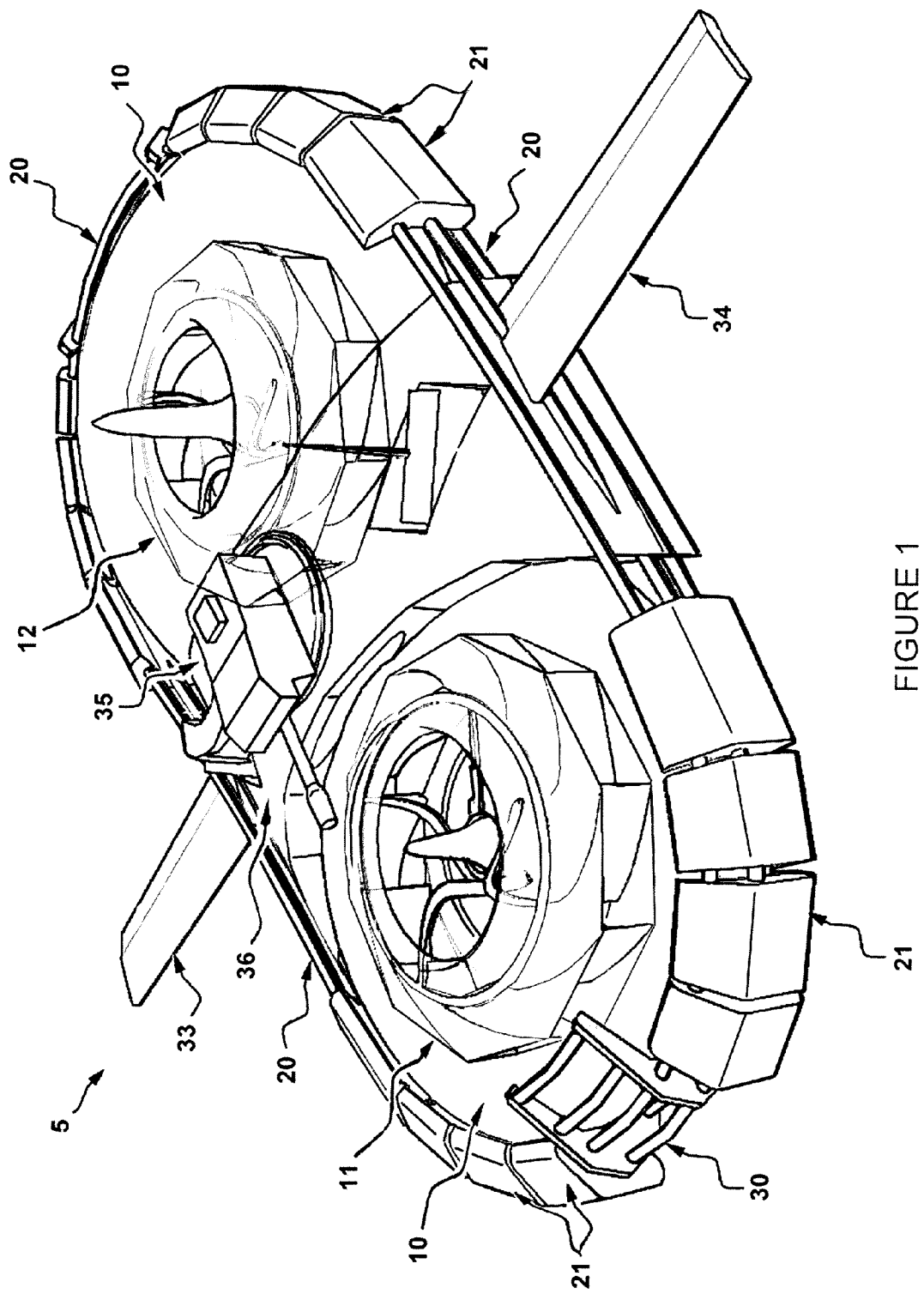
FIG. 1 is a schematic top view of a preferred embodiment of the apparatus of the present invention.
Figure 2:
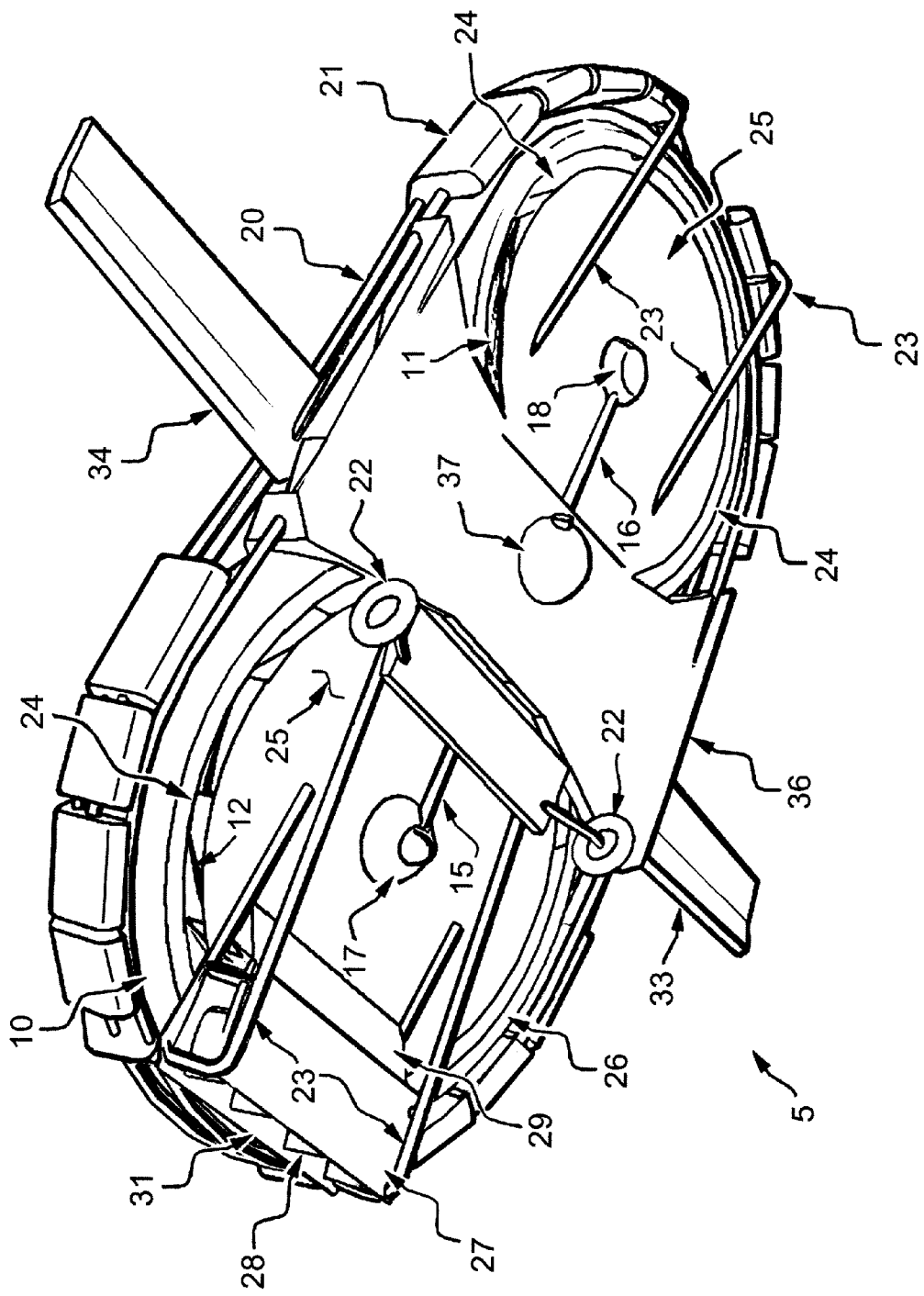
FIG. 2 is a bottom perspective view of a preferred embodiment of the apparatus of the present invention.

Aircraft 5 of FIGS. 1, 2 is shown in a dual fan, longitudinal layout. This layout allows maximum lift while minimizing frontal area. The aircraft 5 can be an unmanned aerial vehicle or manned aircraft having a body or fuselage 10 with dual fabric fans 11, 12. Each fan 11, 12 can be shaft driven by a central mounted motor or engine 14, shafts 15, 16 and angle gearboxes 17, 18. These fore and aft fabric fans 11, 12 provide pressurized air flow for dynamic lift and thrust. The aircraft air-flow is distributed by an enclosed duct within the body shell 10.

The lightweight body/shell 10 can be surrounded by a structure such as a rigid alloy pipe structure 20 which holds strategically placed bumpers 21 (e.g. foam). Manual movement and landing can be supported by wheels 22 and forward and rear skids 23.

A narrow open slot 24 can be provided in the vehicle bottom 25 around the periphery 26 of each fan unit 11, 12. This slot 24 provides a high speed "momentum" curtain of air which entraps the air-cushion which forms underneath the vehicle while in a ground effect mode. Thrust air is expelled via rear open duct 27 across control rudders 28 for directional control. Thrust air can be throttled by the operator or electronically, via a hinged door panel 29 which allows controlled amount of thrust when needed.

A forward mounted hinged vent 30 in the aircraft pressurized duct is operator or electronically controlled to allow air breaking for controlled stops or rapid deceleration.

Directional control by the operator (or electronically) is via aft mounted rudders 28 placed in an aft facing duct 27. Pitch and roll are controlled by the operator (or electronically) via control of lift fan air outlet slot 31. A lift air outlet center panel 32 acts as a restrictor to vary the lift air vent opening along the periphery of each fan unit 11, 12. Deployable wings 33, 34 are placed on the sides of the vehicle body/shell 10 for long range transits.

A center mounted generic weapon mount 35 and modular equipment trunk 36 can be located on a central portion of shell body 10 which houses the engine, fuel and control mechanicals. A multi capability camera, infrared or night vision, laser targeting pod 37 is located under center of the UAV.

Referring to FIG. 3, a personal flying car 6 is shown which can utilize a dual fabric fan 11, 12 and drive arrangement. Directional controls, stability and lift are as the vehicle 5 of FIGS. 1 and 2. The design would incorporate an automotive like stylish lightweight body shell 13, enclosed interior cockpit with automotive controls and amenities. The attitude control is enhanced for high speed ground effect transit with the incorporation of a forward electronically controlled canard.

Referring to FIG. 4, a craft 7 that is similar to the flying car 6 of FIG. 3 is shown but utilizing a more efficient skirted hovercraft concept. One fabric fan 11 or 12 can be used for reduced lift air and quiet propulsion air to be vented out the rear duct 51. Control is augmented via side mounted operator controlled air vents 52. Directional control and air breaking are similar to the vehicle of FIGS. 1 and 2.

Referring to FIG. 5, a hovercraft recreational vehicle 8 utilizing the same general dual fabric fan 11, 12 and drive arrangement of FIGS. 1 and 2 with less horsepower and smaller fans than those required in FIGS. 1 and 2. Lift air can be reduced using a skirted (e.g. rubber fabric skirt) hovercraft hull 19. More air can be directed for thrust. Control is augmented via side mounted operator controlled air vents 61 in both FIGS. 4 and 5. Directional control and air breaking are similar to the vehicle in FIGS. 1 and 2.

FIGS. 6-15 show more particularly the construction of the rotating structure 40 of each fan 11, 12. Rotating structure 40 includes a pair of wheels 42, 46. The upper wheel 42 provides an upper ring 43 supported by a plurality of radially extending spokes 44. Upper wheel 42 is attached to hub 45. Hub 45 can be generally cylindrically shaped and mounted upon drive shaft 41 which extends upwardly from gear box 17 or 18.

In FIG. 7, the reference numeral 50 designates the rotational axis of hub 45 and rotating structure 40. Arrows 39, 53, 54 show intake, intermediate and discharge air flow. Annular fan volute housing 38 helps control the flow of air from 39 to 53 to 54 as shown in FIG. 7. Lower wheel 46 provides a tapered annular concave surface 47, lower ring 48, and radially extending support panels 49 that extend between surface 47 and hub 45. The rotating structure 40 includes a stirrup assembly 60 comprised of a plurality of stirrups 55 and a plurality of air foil panels 56. Each air foil panel 56 attaches to stirrup 55 at stirrup panel 70. Attachment openings 57 are provided on ring 43. Similarly sized and spaced attachment openings 58 are provided on stirrup 55. Likewise, openings 59 are provided on lower wheel 46.

In FIG. 6, a fastener 75 is shown attaching each stirrup 55 to ring 43 and upper wheel 42. FIGS. 12-15 illustrate an exemplary construction for a stirrup 55. Each stirrup 55 can provide panels 70-74 as shown in FIGS. 12-15 and fold lines 64-69 as shown in FIGS. 12-15. Fabric stirrup sheet 63 is thus folded at fold line 64 as shown in FIGS. 12-14 to provide a channel 62 through which air flows along the path designated by arrows 39, 53, 54 in FIG. 7.

Figure 16:
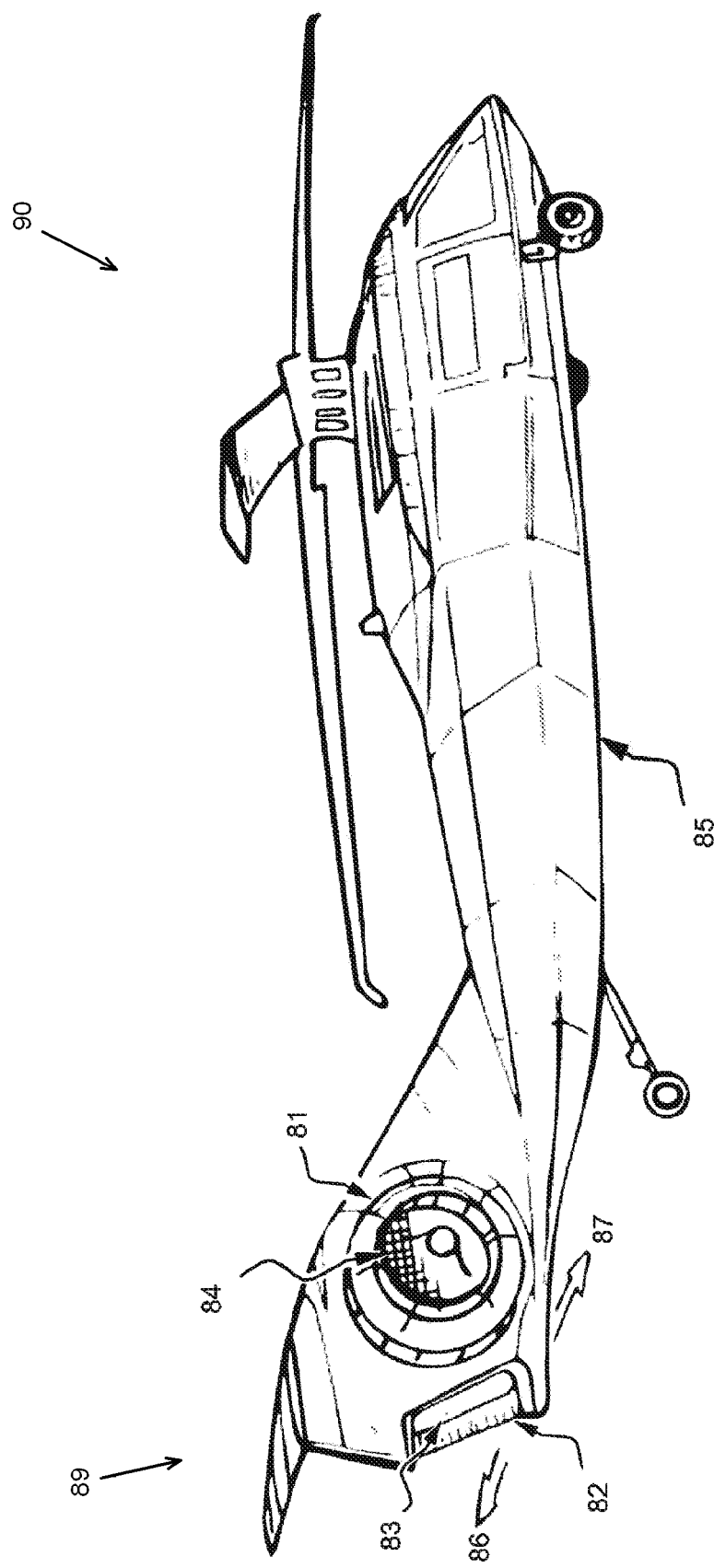
FIG. 16 is perspective view of a stealth helicopter anti-torque fan.

FIG. 16 shows another embodiment of the apparatus of the present invention, designated generally by the numeral 90 and having airframe 85. Fan 81 can be a fan as constructed in the embodiments of FIGS. 1-15. A centrifugal fan 81 constructed out of lightweight, strong flexible aramid or other advanced fabrics with semi-rigid and rigid shaped foils. The fan construction of the present invention minimizes fan weight and maximizes absorption to levels typical in light aircraft or UAV propulsion or large industrial air supply applications.

As shown in FIGS. 8-15, the fan consists of a rigid torque transferring hub 45 consisting of an upper open spoke structure extending to a retaining rim on the intake side of the fan and a solid cone shaped, lower half formed to the same diameter as the upper rim. The hub 45 can be constructed of fiber reinforced plastic, metal or plastic depending on ultimate loads required.

Attached to the periphery of the hub 45 upper and lower rim is a circular set of fabric "stirrups" 55 cut to the geometry shown in FIGS. 8-15 and glued in a interlocking pattern (see FIGS. 9-15). These stirrups 55 can be defined for any number of blades or blade angle.

These stirrups 55 form into a complete fan shroud or stirrup assembly 60. Each stirrup 55 of the shroud 60 is folded to receive the curved blade 56 geometry precisely within the inside cusp (see FIG. 11). Each fabric stirrup 55 receives a rigid formed airfoil blade 56 adhered in place (see FIG. 11).

The assembly of these components forms rigid but forgiving fan geometry when spun as required for air moving fan. The use of preformed fabric pattern allows the optimization of fiber direction to resist operating loads and the interlocking nature of the stirrups share centrifugal forces.

As compared to conventional commercial fans which have a heavy, rigid fan shroud assembly, to define and maintain its geometry. This fabric fan uses its flexible shroud material only to retain the blade forms against the centrifugal forces trying to throw them outward. The self generating centrifugal forces stress the flexible fan assembly to maintain the desired geometry during rotation.

The anti-torque nature is in its application to the helicopter configuration, the small tail rotor this replaces to counter the torque imparted to the helicopter from the larger lift rotor. Stealth helicopter 90 anti-torque fan 81 is concealed from radar in a stealth helicopter airframe tail portion 89. The helicopter airframe 85 has a port side, sliding (fore and aft) air-flow directional shutter 82, and starboard, sliding (fore and aft) air-flow directional shutter 83. The fabric fan thrust outlet airflow is directional and controlled by the pilot via flow directing shutters or vanes. These vanes can be cable controlled to redirect the airflow or thrust biased to either side or both sides air flow which is considered neutral.

FIG. 16 shows a fan intake radar shielding and foreign object damage ("FOD") protection grate 84. Airframe 85 can be a stealth helicopter airframe 85. The helicopter 90 has a port anti-torque air-flow thrust direction 86, and a starboard anti-torque air-flow thrust direction 87. The fabric fan thrust outlet airflow is directional controlled by the pilot via flow directing shutters or vanes, these vanes can be cable controlled or powered directly from the normal pilot rudder pedals in the helicopter for the same directional control function as the tail rotor it replaces.

The primary challenge to helicopter design today is noise abatement, general simplicity and reduced pilot workload for control, the present invention application addresses these needs.

Many "Fan anti-torque" benefits are applicable to any non-stealth helicopters both present and future design. Fan anti-torque thrust can be used for added forward propulsion and pitch control as never before. Not only are the rotating fan blades protected from FOD and ground/building proximity strikes, but the nature of the fabric fan is more durable due to the flexibility inherent in the aramid fabric construction. The fabric fan can resist direct small arms fire and shrapnel. The fan constructions central use of anti-ballistic aramid fiber and the impact resistance of its flexible nature combine to make a rugged structure not susceptible to impact cracking and off-balance conditions due to its extreme lightweight.

"The noise from the tail rotor is considered as the main source of the rotorcraft high frequency noise. In addition, due to its increased weight and complex structure, it is not convenient." See CAO, et al., "Recent Development of Rotorcraft Configuration", *Recent Patents on Engineering*, 1, 49-70, 2007.

The following is a list of parts and materials suitable for use in the present invention.

PARTS LIST

| Part Number | Description |
| --- | --- |
| 5 | aircraft |
| 6 | vehicle/craft |
| 7 | vehicle/craft |
| 8 | vehicle/craft |

-continued

| Part Number | Description |
| --- | --- |
| 10 | body/shell |
| 11 | fan |
| 12 | fan |
| 13 | automotive body/shell |
| 14 | engine |
| 15 | shaft |
| 16 | shaft |
| 17 | gearbox |
| 18 | gearbox |
| 19 | hull |
| 20 | rigid structure/pipe structure |
| 21 | bumper |
| 22 | wheel |
| 23 | skid |
| 24 | slot |
| 25 | bottom |
| 26 | periphery |
| 27 | rear duct |
| 28 | rudder |
| 29 | hinged door panel |
| 30 | hinged vent |
| 31 | air outlet slot |
| 32 | lift air outlet panel |
| 33 | wing |
| 34 | wing |
| 35 | weapon mount |
| 36 | trunk |
| 37 | pod |
| 38 | fan volute housing |
| 39 | intake air flow arrow |
| 40 | rotating structure |
| 41 | shaft |
| 42 | upper wheel |
| 43 | upper ring |
| 44 | spoke |
| 45 | hub |
| 46 | lower wheel |
| 47 | concave surface |
| 48 | lower ring |
| 49 | radially extending support panel |
| 50 | rotational axis |
| 51 | vent/rear duct |
| 52 | vent |
| 53 | arrow |
| 54 | arrow |
| 55 | stirrup |
| 56 | airfoil panel |
| 57 | attachment opening |
| 58 | attachment opening |
| 59 | attachment opening |
| 60 | stirrup assembly/shroud |
| 61 | vent |
| 62 | air flow channel |
| 63 | fabric stirrup sheet |
| 64 | fold line |
| 65 | fold line |
| 66 | fold line |
| 67 | fold line |
| 68 | fold line |
| 69 | fold line |
| 70 | panel |
| 71 | panel |
| 72 | panel |
| 73 | panel |
| 74 | panel |
| 75 | fastener |
| 81 | fan |
| 82 | shutter |
| 83 | shutter |
| 84 | Fan intake radar shielding and FOD protection grate |
| 85 | airframe |
| 86 | Port anti-torque air-flow thrust direction |
| 87 | Starboard anti-torque air-flow thrust direction. |
| 89 | tail portion |
| 90 | helicopter |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. An aircraft, comprising:
  a) an air frame;
  b) a centrifugal fan that produces a cushion of air that elevates the air frame above an underlying support surface;
  c) the fan including a hub and multiple fabric stirrups;
  d) the stirrups including curved flexible portions forming a shroud; and
  e) wherein centrifugal forces stress the stirrups to maintain a desired stirrup geometry during rotation.

2. The aircraft of claim 1 wherein the aircraft is an unmanned aerial vehicle.

3. The aircraft of claim 1 wherein the aircraft has a cockpit for enabling it to be manned.

4. An aircraft, comprising:
  a) an air frame;
  b) a centrifugal fan that produces a cushion of air that elevates the air frame above an underlying support surface;
  c) the fan including a structural hub and multiple fabric stirrups mounted to the hub;
  d) the fabric stirrups including curved flexible portions forming a shroud; and
  e) wherein centrifugal forces stress the fabric stirrups to maintain a desired stirrup geometry during rotation.

5. The aircraft of claim 4 wherein the aircraft is an unmanned aerial vehicle.

6. The aircraft of claim 4 wherein the aircraft has a cockpit for enabling it to be manned.

7. The aircraft of claim 4 wherein the structural hub includes a ring.

8. The aircraft of claim 4 wherein the structural hub includes a plurality of radially extending spokes.

9. The aircraft of claim 7 wherein each stirrup is attached in part to the ring.

10. The aircraft of claim 8 wherein the structural hub includes a cylindrically shaped member.

11. The aircraft of claim 10 wherein the radially extending spokes connect to the cylindrically shaped member.

12. The aircraft of claim 4 wherein each stirrup carries an airfoil blade.

13. The aircraft of claim 4 wherein the structural hub includes a generally conically shaped portion.

14. The aircraft of claim 4 wherein the structural hub includes a tapered portion.

15. The aircraft of claim 14 wherein the structural hub includes a cylindrically shaped member and the tapered portion is attached to the cylindrically shaped member.

16. The aircraft of claim 7 wherein the structural hub includes a cylindrically shaped member and a tapered portion is attached to the cylindrically shaped member, and wherein each stirrup is connected to the ring and the tapered portion.

17. The aircraft of claim 4 wherein each stirrup has upper and lower flaps that are generally perpendicular to an axis of rotation of the hub.

18. The aircraft of claim 7 wherein each stirrup has upper and lower flaps that are generally perpendicular to an axis of rotation of the hub.

19. The aircraft of claim 13 wherein each stirrup has upper and lower flaps that are generally perpendicular to an axis of rotation of the hub.

20. The aircraft of claim 4 wherein each stirrup has a flange that attaches to both of the flaps forming a channel that is bounded by flanges of a pair of adjacent stirrups and by the flaps of a stirrup.

21. The aircraft of claim 4 wherein an air flow channel is positioned in between a pair of adjacent stirrups.

22. The aircraft of claim 4 wherein air flow through the fan is through an inlet and out via channels of the stirrups.

23. The aircraft of claim 9 wherein air flow through the fan is through an inlet surrounded by the ring and out via channels of the stirrups.

\* \* \* \* \*